(12) United States Patent
Martin

(10) Patent No.: US 11,341,612 B1
(45) Date of Patent: May 24, 2022

(54) METHOD AND SYSTEM FOR AUTOMATIC CORRECTION AND GENERATION OF FACIAL IMAGES

(71) Applicant: Idemia Identity & Security USA LLC, Billerica, MA (US)

(72) Inventor: Brian Martin, Sudbury, MA (US)

(73) Assignee: Idemia Identity & Security USA LLC, Billerica, MA (US)

(*) Notice: Subject to any disclaimer, the term of this patent is extended or adjusted under 35 U.S.C. 154(b) by 192 days.

(21) Appl. No.: 16/750,883

(22) Filed: Jan. 23, 2020

Related U.S. Application Data

(60) Provisional application No. 62/795,854, filed on Jan. 23, 2019.

(51) Int. Cl.
*G06K 9/00* (2022.01)
*G06T 5/00* (2006.01)
*G06T 7/00* (2017.01)

(52) U.S. Cl.
CPC .......... *G06T 5/001* (2013.01); *G06T 7/0002* (2013.01); *G06T 2207/20081* (2013.01); *G06T 2207/30168* (2013.01); *G06T 2207/30201* (2013.01)

(58) Field of Classification Search
CPC ............ G06T 5/001; G06T 7/0002; G06T 2207/20081; G06T 2207/30168; G06T 2207/30201
USPC ........................................................ 382/155
See application file for complete search history.

(56) References Cited

U.S. PATENT DOCUMENTS

| | | | | |
|---|---|---|---|---|
| 9,047,538 B2* | 6/2015 | Nechyba | ................. | H04N 5/228 |
| 9,148,552 B2* | 9/2015 | Sato | .................... | H04N 5/35721 |
| 11,068,746 B2* | 7/2021 | Bala | ...................... | G06K 9/6253 |
| 2003/0012414 A1* | 1/2003 | Luo | .......................... | G06T 5/007 |
| | | | | 382/118 |
| 2013/0108156 A1* | 5/2013 | Sakamaki | ............... | G06T 11/00 |
| | | | | 382/167 |
| 2017/0069056 A1* | 3/2017 | Sachs | ...................... | G06T 7/571 |

OTHER PUBLICATIONS

Capece, Nicola, et al. "Deepflash: Turning a flash selfie into a studio portrait." Signal Processing: Image Communication 77 (2019): 28-39. (Year: 2019).*
Zhang, Gang, et al. "Generative adversarial network with spatial attention for face attribute editing." Proceedings of the European conference on computer vision (ECCV). 2018. (Year: 2018).*

* cited by examiner

*Primary Examiner* — Jonathan S Lee
(74) *Attorney, Agent, or Firm* — Robert Alexander Ellis Facey; Adam Foster Lewental

(57) ABSTRACT

A method for automatic correction and generation of facial images includes storing, by a computer system, multiple constraints specifying an image quality. The computer system receives a first image of a face of a user from a computer device. The computer system determines that the first image of the face of the user violates at least one constraint of the multiple constraints specifying the image quality. Responsive to the determining that the first image of the face of the user violates the at least one constraint, the computer system generates a second image of the face of the user based on the first image of the face of the user and the at least one constraint, such that the second image of the face of the user satisfies the at least one constraint. A display device of the computer system displays the second image of the face of the user.

20 Claims, 14 Drawing Sheets

METHOD AND SYSTEM FOR AUTOMATIC CORRECTION AND GENERATION OF FACIAL IMAGES

CROSS-REFERENCE TO RELATED APPLICATIONS

This application claims the benefit of U.S. Provisional Application No. 62/795,854, filed on Jan. 23, 2020, which is incorporated herein by reference in its entirety.

FIELD OF THE INVENTION

This description relates generally to image processing and specifically to methods and systems for automatic correction and generation of facial images.

BACKGROUND

Enrollment of a face portrait image for applications such as an identification card, a driver's license, or a passport often requires a human operator to check that the enrollment image meets the requirements for the identification document. In cases where there is no human operator to ensure compliance with the imaging requirements, the subject of the portrait image must try to comply with any automated prompts if available. The compliance is often unreliable because the subject may not understand or may not want to comply with the prompts. Moreover, the subject may be unable to solve the compliance issues.

SUMMARY

Methods and systems for automatic correction and generation of facial images are disclosed. A computer system stores multiple constraints specifying an image quality. The computer system receives a first image of a face of a user from a computer device. The computer system determines that the first image of the face of the user violates at least one constraint of the multiple constraints specifying the image quality. Responsive to the determining that the first image of the face of the user violates the at least one constraint, the computer system generates a second image of the face of the user based on the first image of the face of the user and the at least one constraint, such that the second image of the face of the user satisfies the at least one constraint. The computer system displays the second image of the face of the user on a display device of the computer system.

In some embodiments, the at least one constraint specifies a limit on a focal length of a camera lens used to capture images.

In some embodiments, the generating of the second image of the face of the user includes determining, by the computer system, a first focal length of a first camera lens used to capture the first image of the face of the user. The computer system determines a difference between the first focal length of the first camera lens and a limit on a second focal length of a second camera lens. The at least one constraint specifies the limit on the second focal length. The second image of the face of the user is generated based on the difference between the first focal length and the limit on the second focal length.

In some embodiments, the at least one constraint specifies a limit on an amount of flash lighting used to capture images.

In some embodiments, the at least one constraint specifies a visual backdrop of captured images.

In some embodiments, the determining that the first image of the face of the user violates the at least one constraint includes determining, by the computer system, that the user is wearing glasses in the first image. The generating of the second image includes deleting, by the computer system, a portion of the first image. The portion corresponds to the glasses.

In some embodiments, the determining that the first image of the face of the user violates the at least one constraint includes determining, by the computer system, a first expression of the user in the first image. The generating of the second image includes adjusting, by the computer system, the expression of the user in the first image to match a second expression specified by the at least one constraint.

In some embodiments, the determining that the first image of the face of the user violates the at least one constraint includes determining, by the computer system, a first facial pose of the user in the first image. The generating of the second image includes adjusting, by the computer system, the first facial pose to match a second facial pose specified by the at least one constraint.

In some embodiments, the generating of the second image is performed by a generative adversarial network of the computer system.

In some embodiments, the generating of the second image includes extracting, by the computer system, a feature vector from the first image. The feature vector represents a first focal length of a first camera lens used to capture the first image. The computer system produces the second image using a machine learning model based on the feature vector. The machine learning model is trained to determine a difference between the first focal length and a limit on a second focal length of a second camera lens specified by the plurality of constraints.

Among other benefits and advantages of the embodiments disclosed herein, non-compliance in image capture is addressed by correcting deficiencies in the image and rendering a compliant image. The disclosed embodiments enable self-enrollment and automatic correction of face portraits taken from mobile phones. The resulting images have characteristics that match those of traditional (compliant) face enrollment. The disclosed embodiments enable the correction of facial pose and facial expression, re-illumination of a face artificially, changing the characteristics of focal length of an image, and rendering a background of a portrait to look like a standard photographic backdrop. The disclosed embodiments enable the detection of image quality and face quality.

The disclosed embodiments further enable a self-enrollment system that allows facial portrait enrollment with no human operator oversight. In a conventional system, in which an image does not meet the requirements for portrait enrollment (for example, when a subject is wearing glasses and no glasses are permitted according to the enrollment constraints), the image can be considered a failure to enroll or a failure to acquire. The disclosed embodiments reduce the error rate by automatically correcting the faulty image characteristics. Such corrected images can lead to image portraits of a high image quality and in compliance with, for example, International Civil Aviation Organization (ICAO) standards.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

The enrollment of a face portrait image for applications such as identity cards, driver's licenses, or passports can require a human operator to check that the enrollment image meets the requirements for the identity document. In cases where there is no human operator to ensure compliance with imaging requirements, the subject of the portrait image must try to comply with any automated prompts. The compliance by the subject of the portrait image can be unreliable because the subject may not understand or want to comply with feedback. Moreover, the subject may be unable to solve compliance problems. For example, if the amount of illumination is not compliant, the subject of the portrait image may not be able to find appropriate illumination conditions to capture a compliant image. In another example, a focal length of a camera lens may be inappropriate for the type of image capture required. Most subjects do not have the ability to change a camera lens to ensure compliance.

The embodiments disclosed herein provide methods and systems for automatic correction and generation of facial images.

Figure 1:
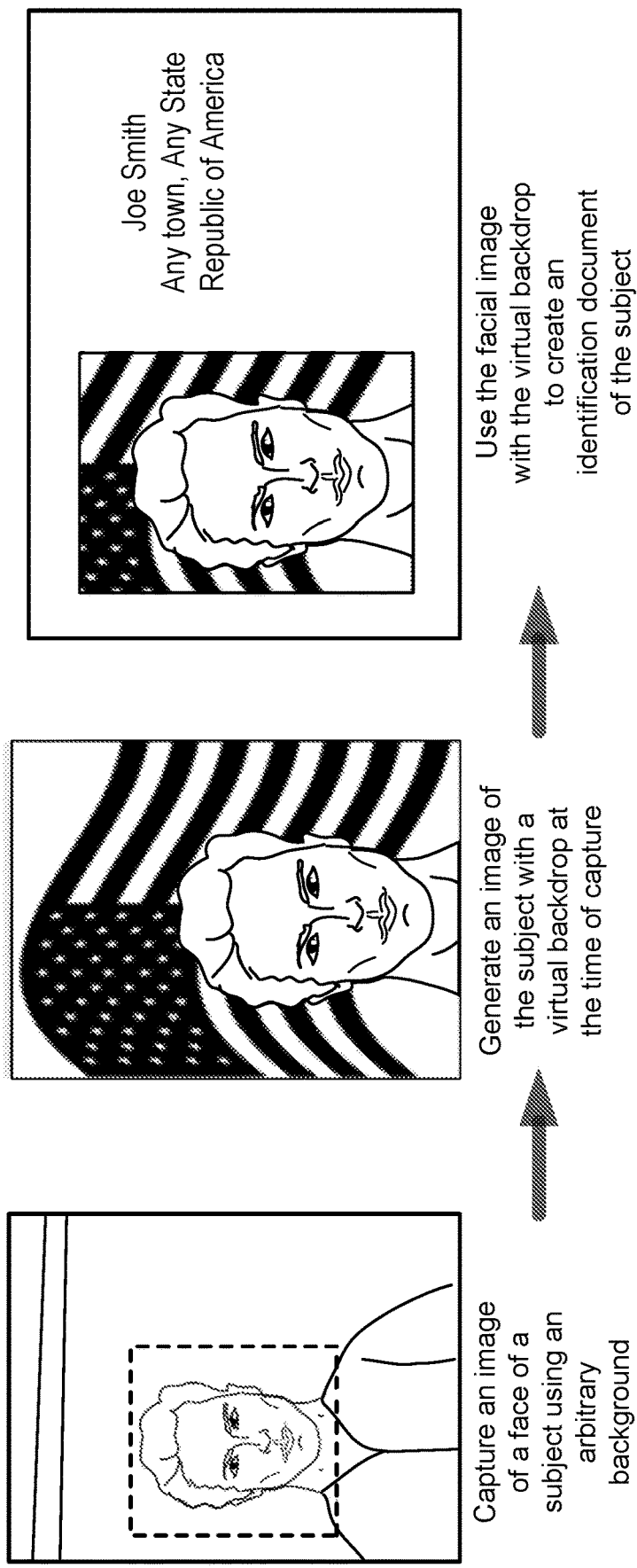
FIG. 1 illustrates an example work flow of generating a portrait image having a virtual backdrop, according to some implementations.

FIG. 1 illustrates an example work flow of generating a portrait image having a virtual backdrop, according to some implementations. Digital portraits are used to create identification document such as identification cards and driver licenses. Such digital portraits follow standards that govern form, function, and esthetics. For example, the size of the portrait in a given field of view can be used to ensure that the collected photographic image can be rendered by special printers so that the portrait can be printed on plastic substrates at a sufficient viewable image quality to identify the subject. At capture time, the image generally must meet certain resolution requirements. Additionally, the image generally must be frontal with a neutral expression. The image must be taken at a specific distance under sufficient illumination and free of shadows and bright spots. The captured image generally must scale properly.

Images can be configured to support facial recognition systems and can be used on identification documents to provide biometric facial recognition. To ensure the capture of the image against a solid neutral color background, some jurisdictions mandate the use of a "physical backdrop" in which the subject is required to stand in front of a solid surface with a solid color (for example, light blue, white, tan, or light gray). Sometimes, a wall can provide the desired characteristics. Sometime a physical backdrop, like a pull-down screen, is used. Generally, the surface of the physical backdrop must be non-glossy or matte to reduce glare and reflection.

In some cases, however, it can be impossible or infeasible to control the background against which an image or a digital portrait of a subject is captured. For example, a mobile application can be developed and executed on a mobile device to capture an image for a portrait. A jurisdiction can use an ambulatory service to register people in less-developed areas, such as rural areas, in which a location of the ambulatory service can be changed from time to time. For example, a jurisdiction can outsource image capture to a "tag agent" who does not have control over the space where the image capture takes place. In such scenarios, the image background can differ considerably and can be noisy, leading to deterioration of the image quality. If a portrait of inadequate image quality is used on an identification document, the performance of image recognition or biometric recognition can be adversely affected.

Techniques to remove a background from a region of interest of a digital image to highlight a portrait can be implemented using a two-step process in which the background scene is imaged first, and then the subject is introduced with the background scene. Thereafter, the background scene can be subtracted to generate a portrait of the subject. Other techniques can be implemented using a one-step process that relies on image processing to (a) identify patterns unique to the foreground (corresponding to a portrait of the subject) and patterns unique to the background (for example, corresponding to a noisy scene), and (b) determine a boundary between the foreground and the background by generating a best guess to isolate the former from the latter. Such techniques offer the ability to eliminate or change the background of a scene, such that a portrait object or a foreground object can be highlighted.

In FIG. 1, the left-most panel shows an example image of a subject taken with an arbitrary background, for example, a window covered by vertical blinds. For the purpose of discussion herein, the face of the subject can form the foreground of the photo. The face of the subject can provide a basis for biometric identification of the subject. A number of constraints can be required on the captured image for image quality. For example, the subject in the image should not wear a hat or dark sun glasses, the subject should look straight into the camera, or the subject may also look slightly towards one side of the camera.

A variety of backgrounds of the image may be supported. For example, in some configurations, the background can include any background, indoor or outdoor. The background can be a standardized curtain. The background can also be the side of an ambulatory vehicle on a mission to the country side. An illumination condition in the background can vary across a range of luminance levels. An image can be captured at a stationary office location, such as at a department of motor vehicles (DMV), a passport service of a post office, or a registration office of an institution. An image can also be captured by an ambulatory vehicle, for example, an image capture vehicle deployed in the countryside, to provide photographic identification documents to people residing in rural areas. Methods of generating a portrait image having a virtual backdrop are discussed in U.S. Pat. No. 9,286,508, which is incorporated by reference in its entirety herein.

The middle panel of FIG. 1 illustrates a portrait generated from the captured image. The portrait shows the face of the subject against a virtual backdrop. The subject's face has been extracted from the photo as the foreground, for example, in a process sometimes referred to as "alpha matting." The extracted face of the subject can be used for identification purpose. The virtual backdrop can be used to provide proof that the extracted face has been endorsed by the issuing entity. A virtual backdrop can replace the original background. The virtual backdrop can be watermarked to uniquely identify the source of the portrait as coming from the issuing entity. Identification of the source of the portrait can provide a level of authentication for the identification document to which the portrait attaches. The virtual backdrop can also provide aesthetic appeals in addition to uniformity. Some virtual backdrops can provide a waving flag to elicit, for example, patriotic feelings from a viewer.

The right panel in FIG. 1 shows an identification card issued with the extracted portrait image of the subject using the virtual backdrop. The identification card can include a government-issued identification card. Examples of government-issued identification cards can include a driver license, a passport, a permanent resident card, a social security card, a Medicare card, or a Medicaid card. A vetting process can be in place, for example, to check the background of the subject, before a government-issued identification card is produced. In some implementations, the vetting process can be conducted when the photo is captured and if approved, the identification can be produced on site. The vetting process can be a machine-assisted process including automated steps. The identification card can also be issued by a non-government entity, for example, an educational institution, a commercial entity such as corporation, or a partnership. The identification card can have its own backdrop with watermarks to identify the holder of the identification card or the issuing entity. The watermarks can include digital watermarks covert to naked eyes.

The identification card can be made of plastic, for example, polyvinyl chloride, polyethylene terephthalate based polyesters, acrylonitrile butadiene styrene or polycarbonate. The identification card can further incorporate embedded integrated circuits and can be used as a smart card which can provide data storage and application processing in addition to identification and authentication. For example, the integrated circuits can include a secure cryptoprocessor and a secure file system designed to encrypt the information stored in memory. The memory can include flash memory media, magnetic strips, read-only memory (ROM), erasable programmable read-only memory (EPROM), or an electrically erasable programmable read-only memory (EEPROM). When used as a smart card, the identification card can be read by a reader apparatus capable of interfacing with the integrated circuits and obtaining information stored on the memory. The identification card can have the dimension of ID-1 according to the ISO/IEC 7810 standard as nominally 85.60 by 53.98 millimeters (3.370 in×2.125 in). Another dimension standard can be ID-000 which is nominally 25 by 15 millimeters (0.984 in×0.591 in). For both standards, the thickness is 0.76 millimeters (0.030 in).

The identification card with the subject's portrait can be visually inspected by a human operator to verify that the card is valid and authentic and the holder is the person whose portrait is on the card. The identification card can also be read by a reader apparatus that verifies the validity and authenticity of the identification card, for example, based on digital watermarks that can be covert. The reader apparatus can compare a captured image of holder with the portrait to ascertain whether the holder matches the person in the portrait. Additionally, the reader apparatus can read information from, for example, a magnetic strip on the identification card. The reader apparatus can further communicate with embedded integrated circuits on the identification card as described above.

Figure 2:
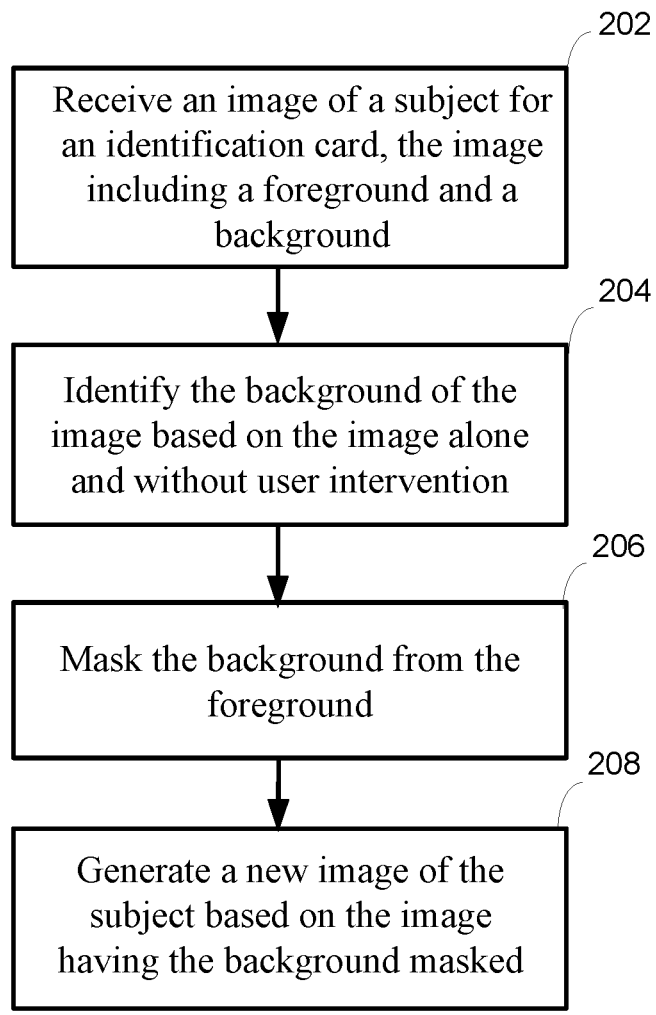
FIG. 2 is a flow chart showing an example method for generating a portrait image having a virtual backdrop, according to some implementations.

FIG. 2 is a flow chart showing an example method for generating a portrait image having a virtual backdrop, according to some implementations. An image of a subject is received (202). The image can be captured for the purpose of generating an identification card of the subject. In remote areas, such as, for example, rural areas away from metropolitan urban areas, small towns and villages away from large cities, fledgling democracies in the Middle East, or elsewhere in the world, the wide usage of identification cards can be impeded by the lack of infrastructure. Yet, wide usage of identification cards in these remote areas can help establish an infrastructure of law and order. Nonetheless for identification cards to be widely used, an image of a card holder must be captured. The image is processed to generate a portrait image of the subject for identification purposes.

To capture images of card holders in relatively remote and less urban areas, relatively less sophisticated equipment may be used. An image may be captured against an arbitrary background and under a variety of lighting conditions. To generate an identification card at the time of capturing the image, the generated portrait should comply with rules of size, orientation, and standard background. Generally, an image captured of a subject can have a foreground and a background. The foreground can correspond to the subject's face while the background corresponds to a background against which the photo was captured. As discussed above, the background can be any background.

A programmed computing device identifies the background of the image based on the image alone and without additional data or user intervention (204). The computing device is programmed to generate portraits of the subject that comply with standard requirements.

Figure 3:
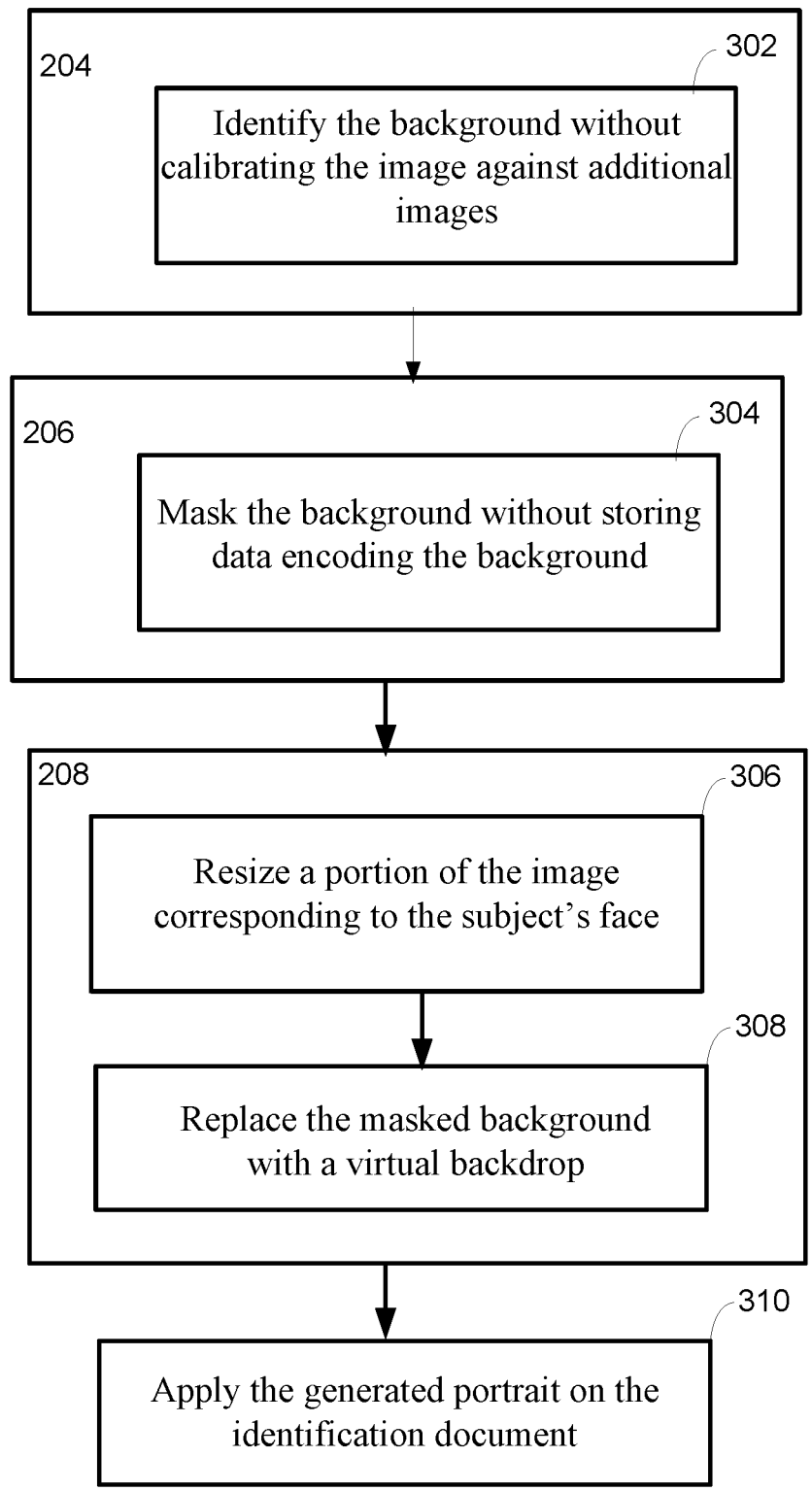
FIG. 3 is a flow chart showing an example method for generating a portrait image having a virtual backdrop, according to some implementations.

FIG. 3 is a flow chart showing an example for generating a portrait image having a virtual backdrop, according to some implementations. The background is automatically determined without calibrating the image against additional images (302). Calibrating can include any form of subtraction, including, for example, simple subtraction, subtraction after translation, rotation, or tilt, subtraction after scaling, or exclusive or (XOR) operations. The additional images refer to pre-stored reference images or additionally captured images. In generating the portrait image, a background of the image is identified without using any pre-stored reference images or any additionally acquired images. The background of the image is identified without subtracting any pre-existing reference image.

Turning back to FIG. 2, subsequently, the automatically identified background is masked from the foreground (206). By masking, pixel values corresponding to the background are set to a special number to render such pixels void for the purpose of display. Once masked, the pixels corresponding to the background are not displayed. In some implementations, the determined background is masked as a "Not a Number" (NaN). The masking can be performed without storing data encoding the determined background (304), as illustrated in FIG. 3. Without storing the data encoding the determined background, subsequent images are not calibrated against the background.

Turning again to FIG. 2, the portrait of the subject is generated based on the captured image with the determined background masked (208). Referring to FIG. 3, portions of the image corresponding to the subject's face can be resized to comply with constraints specified by the identification card (306). These portions can include the foreground of the photo image. The foreground can be zoomed in or shrunk, depending on the size of the portion relative to the constraints. In some implementations, the foreground can also be rearranged in orientation, such as, for example, tilted to show sufficient details of the ear(s) or hair.

Referring to FIG. 3, the masked background is replaced with a virtual backdrop (308). The virtual backdrop can include a uniformly colored pattern, a striped pattern, color gradient pattern, or any other pattern synthesized by a computer. The virtual backdrop can also include an image commonly associated with an organization, a trade, or a product. For example, the virtual backdrop can include, a flag, a tree, a building, a bridge, a landmark, or a trademark. Generally, a virtual backdrop can serve as a source identifier (the entity who is responsible for generating the portrait), a membership identifier (the entity the subject in the portrait is associated with), or evince an emotion (the feeling of being an American or a member of an educational institution).

The generated portrait with the virtual backdrop can then be applied to an identification document (310). As noted above, the identification document can be a passport, or a variety of identification cards, like a driver's license, a student card, or a work badge. The identification document can be generated on-site where the photo is captured, for example, in a remote area where the populace may otherwise be deprived of access to these identification documents. The identification document can be generated by printing apparatuses that who capture and process the images.

Figure 4A:
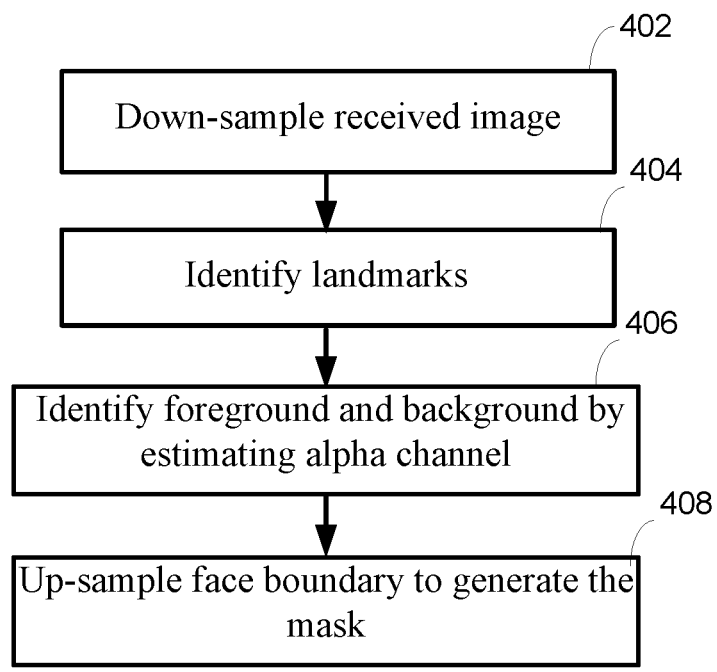
FIGS. 4A-4F illustrate example methods of identifying a foreground and a background, according to some implementations.

FIG. 4A illustrates an example method of estimating a foreground and a background, according to some implementations. A received image can be down-sampled to an image of a smaller size, referred to as a "sparse image" (402). The down-sampling improves processing efficiency for the sparse image. Landmarks, including, for example, ear, head, forehead, mouse, or chin are identified (404). The landmarks can be generally recognized regions on the human face. The landmarks can be identified automatically without user intervention or input. Identified landmarks can be used to generate an eclipse region as an initialization of face mask identified.

A foreground and a background of the photo image can be identified by image matting (406). The image matting process can estimate an alpha channel. Alpha matting is a technique to separate a foreground from a background in an image.

Figure 4B:
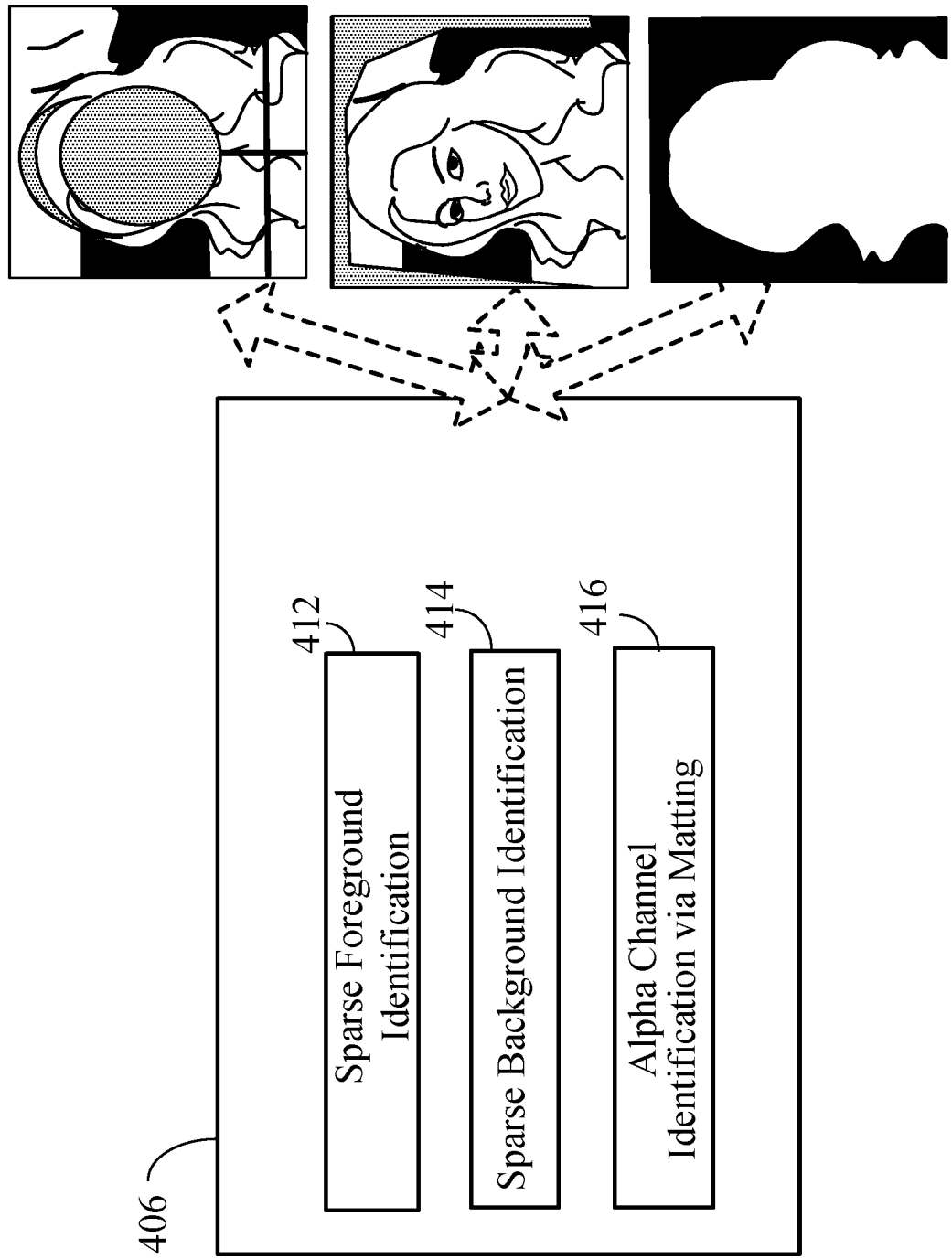

FIG. 4B illustrates an example method of identifying a foreground and a background, according to some implementations. Referring to FIG. 4B, the identification can include sparse foreground identification based on the down-sampled image (412), as illustrated by the top panel on the right. The identification can also include sparse background identification based on the down-sampled image (414), as illustrated by the middle panel on the right. Starting from the already defined sparse foreground and background pixels, some implementations propagate the classifications to all unknown pixels in the image, so that the foreground and background can be separated. This process is referred to as alpha channel identification via matting (416), as illustrated by the bottom panel on the right.

Figure 4C:
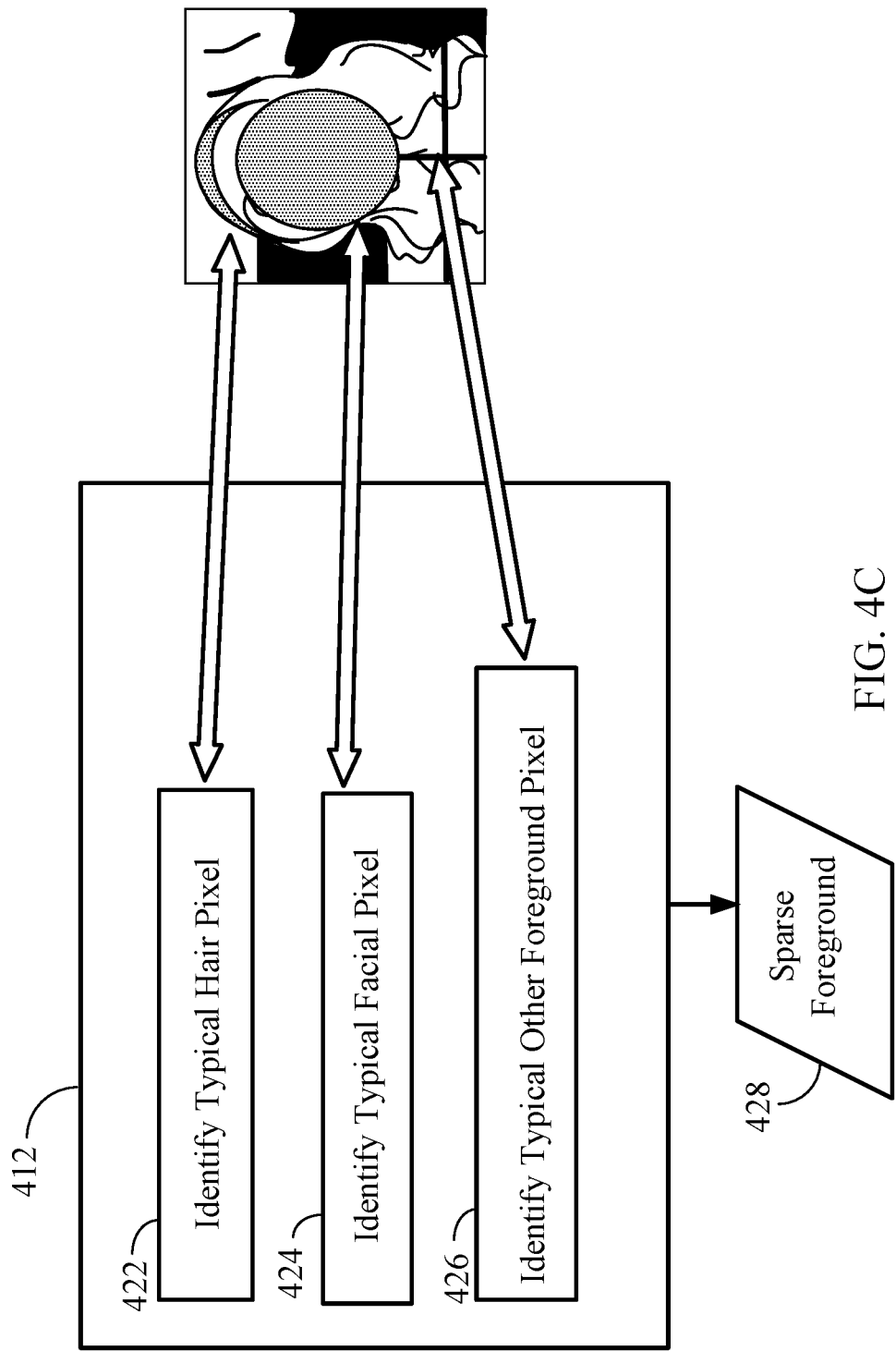

FIG. 4C illustrates an example method of identifying a foreground and a background, according to some implementations. Referring to FIG. 4C, the identification of foreground (412) can include identifying typical hair pixels (422), identifying typical facial pixels (424), and identifying typical other foreground pixels (426). In identifying typical hair pixels, some implementations can generate a hair mask. In identifying typical facial pixels, some implementations can generate a face mask. As illustrated by FIG. 4C, sparse foreground 428 can be obtained based on the above estimations.

Figure 4D:
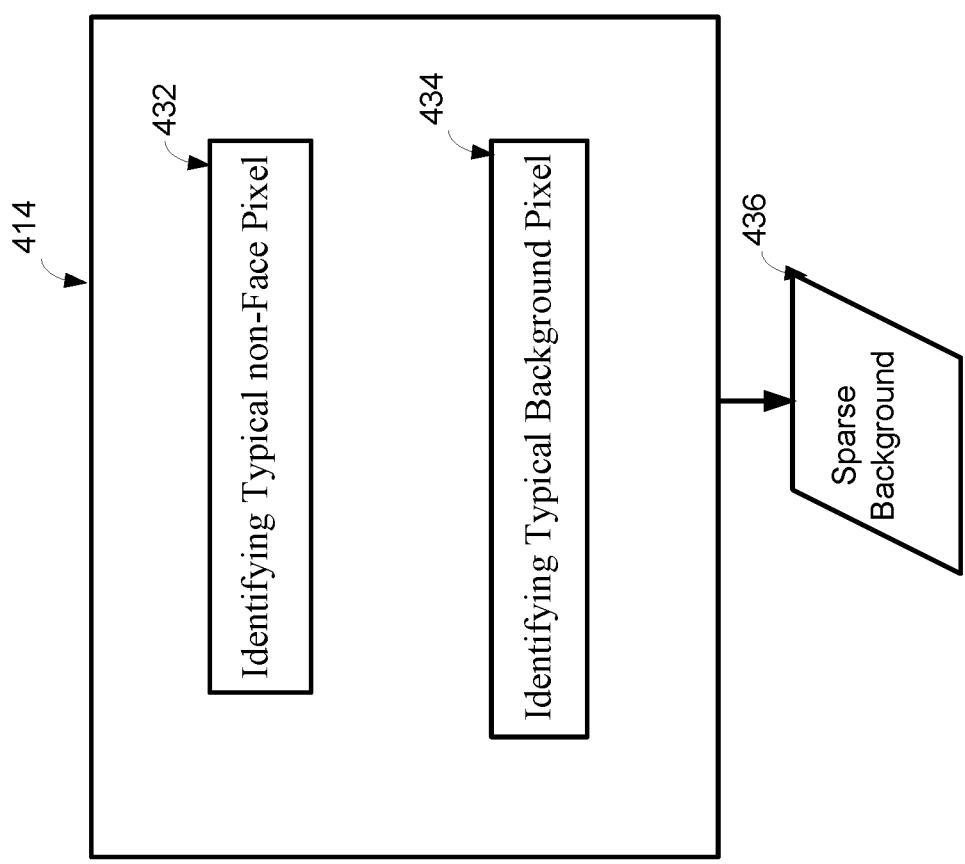

FIG. 4D illustrates an example method of identifying a foreground and a background, according to some implementations. Referring to FIG. 4D, the identifying of the background (414) can include identifying typical non-face pixels (432), and identifying typical background pixels (434). In some implementations, typical non-face pixels can be identified as a probability function p. In some implementations, the final mask is defined as above the eye level. As illustrated by FIG. 4B, the sparse background can be obtained based on the above estimates.

Figure 4E:
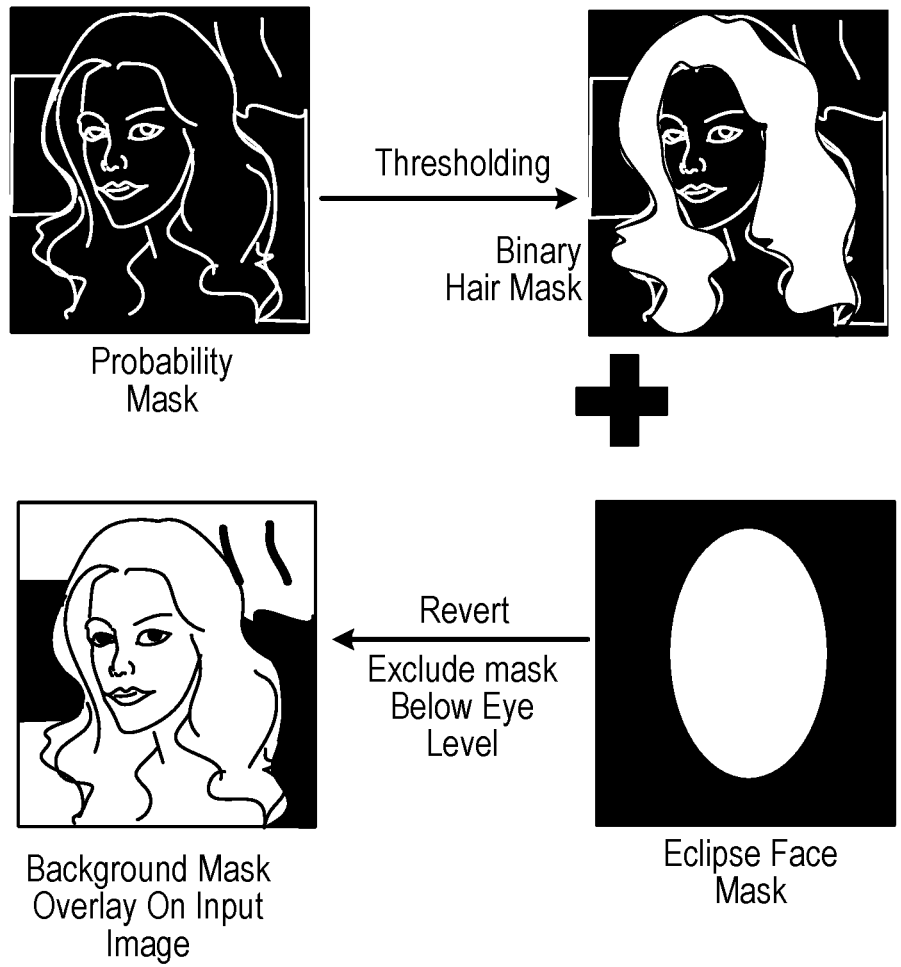

FIG. 4E illustrates an example of identifying a foreground and a background, according to some implementations. A probability mask is generated to denote a probability of each pixel being a hair pixel. An example probability mask for hair is shown in the upper left panel. After thresholding against a cut-off probability, a binary hair mask can be generated, as illustrated by the upper right panel in FIG. 4E. This binary hair mask can then combined with an eclipse face mask, as shown in the lower right panel, to generate a background mask. An example background mask generated is overlaid on the input image, as illustrated by the lower left panel of FIG. 4E. In generating the example background mask, regions in the face mask that are below the eye level are excluded.

The sparse foreground identification (428) and the sparse background identification (436) can be used in image matting (416). Image matting can include affinity computation (442) and unknown pixel propagation (444)—see FIG. 4F. The color of each pixel in the image is a linear combination of the corresponding foreground and background colors.

Figure 4F:
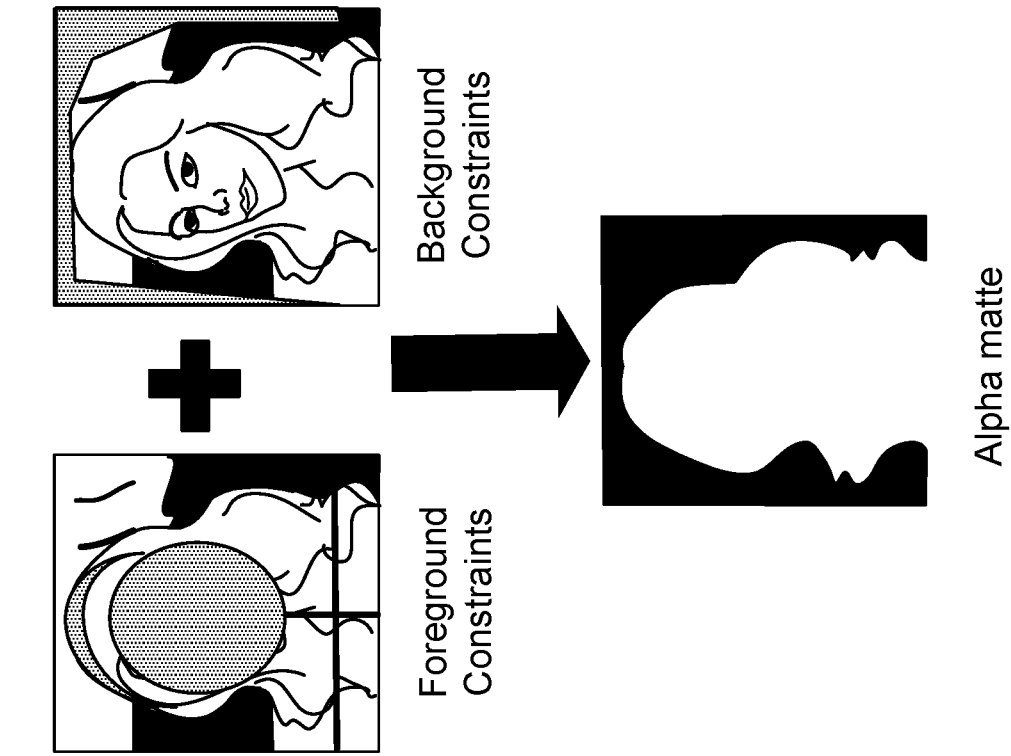
Figure 4F:
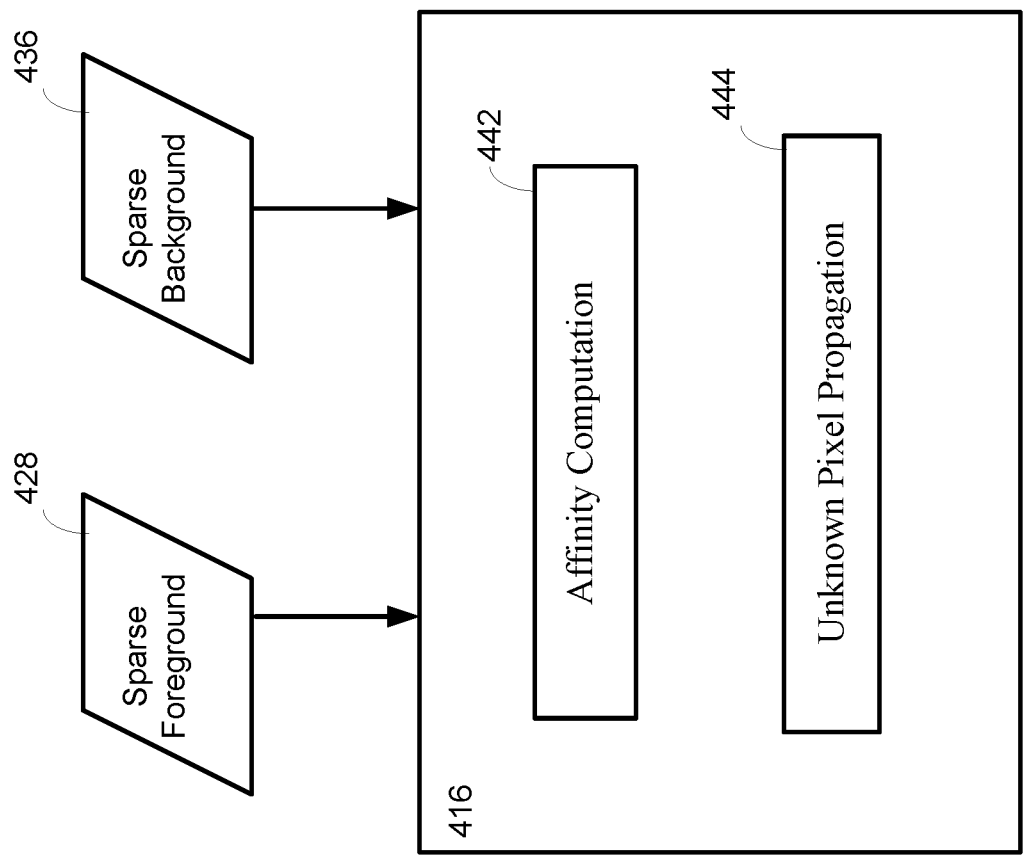

FIG. 4F illustrates an example method of identifying a foreground and a background, according to some implementations. Sparse constraints definition can have sparse foreground pixels defined as 1 and sparse background pixels defined as 0. As demonstrated by the right panels on FIG. 4F, the sparse foreground constraints and the sparse background constraints can be combined and propagated to unknown pixels and whole image alpha matting identification can be performed. In some implementations, a computer system can further adjust or touch up a boundary between the portrait of the subject and the background to improve the image quality of the portraits. For example, a tracing tool can trace a contour and determine where the background boundary starts and ends.

Figure 5A:
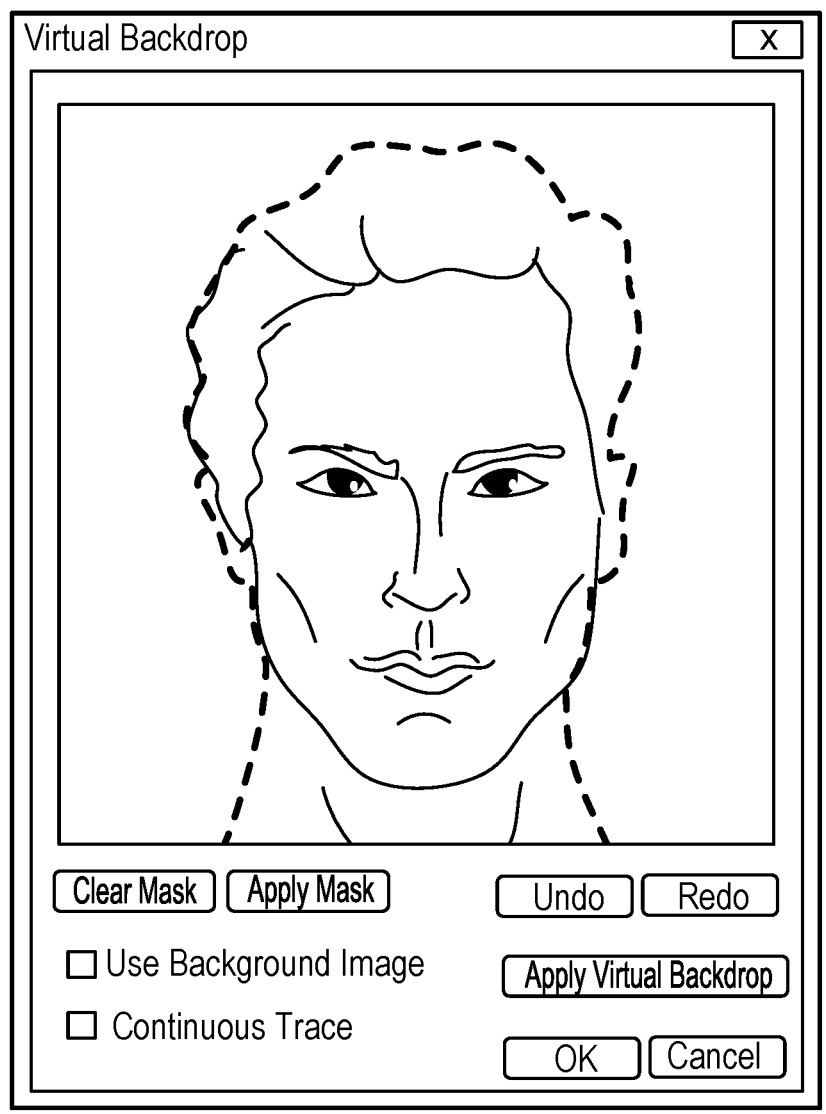
FIG. 5A illustrates an example of tracing a contour of a boundary of a face of a subject, according to some implementations.

FIG. 5A illustrates an example of tracing a contour of a subject's face boundary, according to some implementations. The embodiments disclosed herein can also include a hair filter as a sizing tool to allow a window size of the subject's hair volume to be adjusted.

Figure 5B:
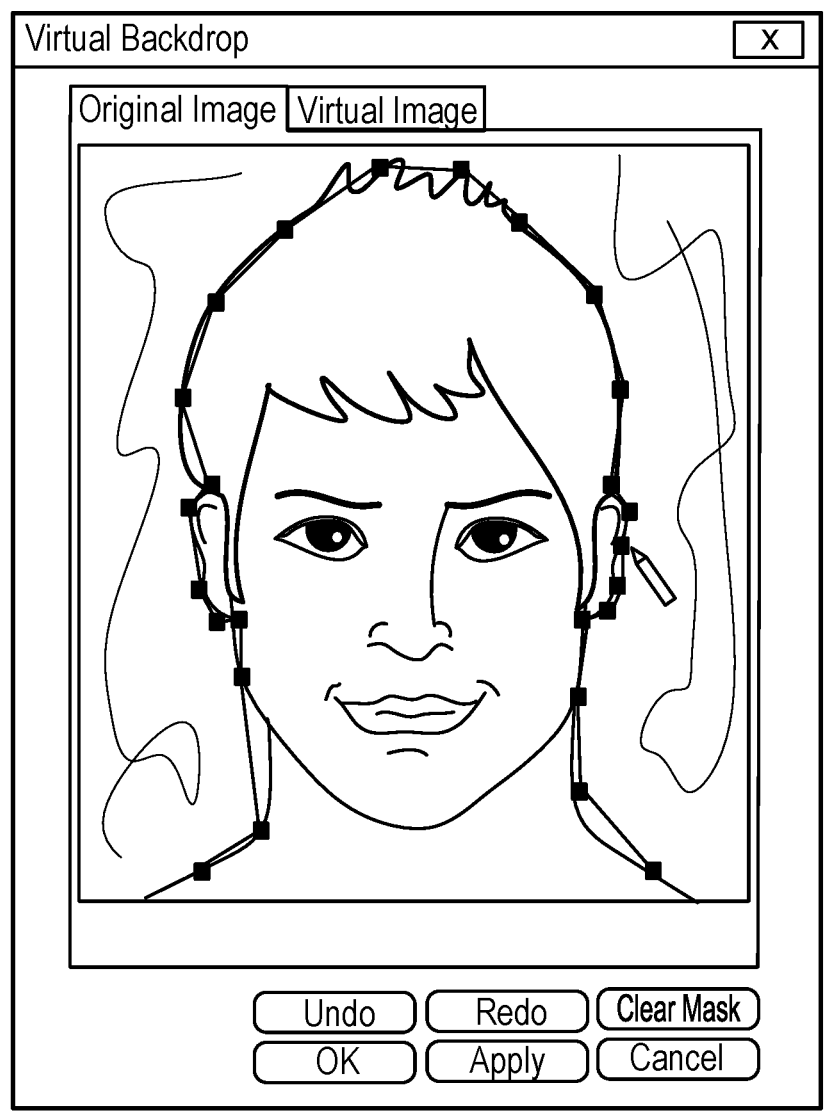
FIG. 5B illustrates an example of adjusting hair volume of a subject, according to some implementations.

FIG. 5B illustrates an example of adjusting a subject's hair volume, according to some implementations. The embodiments disclosed herein can include a local touch up tool. In some implementations, the local touch up tool acts as a magnifying glass to zoom in on a specific area for touch up. Using a touch tool interface a pixel color or pixel values at particular pixel locations on an input image can be adjusted.

Figure 6:
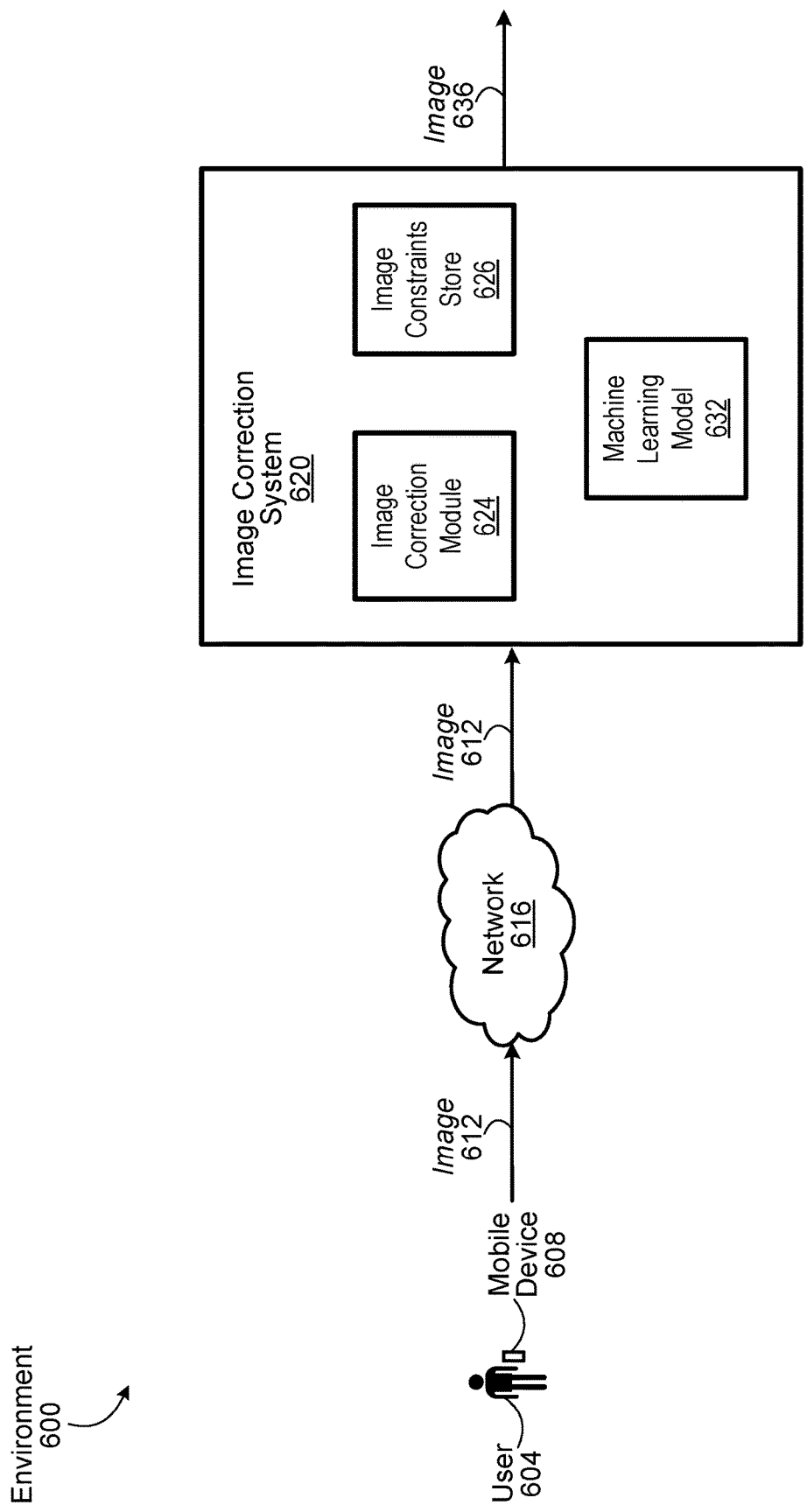
FIG. 6 is a block diagram of an environment for automatic correction and generation of facial images, according to some implementations.

FIG. 6 is a block diagram of an environment 600 for automatic correction and generation of facial images, according to some implementations. The environment 600 includes a user 604, a mobile device 608, a network 616, and an image correction system 620. In other embodiments, the environment 600 includes additional or fewer components than those described herein. Similarly, the functions can be distributed among the components or different entities in a different manner than is described here.

The user 604 is a human user, such as a customer or enrollee who is trying to self-enroll into an identity system or a document creation system, such as at a DMV. In some embodiments, the user 604 is an agent of an enrollee, e.g., a friend, a representative, or a guardian who is authorized to transmit an image 612 of the enrollee to the image correction system 620.

The mobile device 608 captures an image of a face of the user 604. The mobile device 608 can be any hand-held or personal digital device that includes an image sensor or camera, e.g., a smartphone, a tablet, a PC, a laptop. In some examples, the mobile device 608 can be a digital camera. The mobile device 608 is implemented using the components described in more detail with reference to FIG. 8. The mobile device 608 takes a photograph (captures the image 612) of the face of the user 604 and transmits the image 612 of the face to the image correction system 620. The network 616 connects the mobile device 608 of the user 604 to the image correction system 620. The image correction system 620 is implemented using the components described in more detail with reference to FIG. 8. In some embodiments, the image correction system 620 is implemented using computer hardware and software on the mobile device 608 itself. In some embodiments, the image correction system 620 can be located on a local computer that the user 604 can access locally.

The network 616 can include networking resources (for example, networking equipment, nodes, routers, switches, and networking cables) that interconnect the mobile device 608 of the user 604 to the image correction system 620 and help facilitate the image correction system 620's access to data storage and cloud computing services. In an embodiment, the network 616 represents any combination of one or more local networks, wide area networks, or internetworks coupled using wired or wireless links deployed using terrestrial or satellite connections. Data exchanged over the network 616, is transferred using any number of network layer protocols, such as Internet Protocol (IP), Multiprotocol Label Switching (MPLS), Asynchronous Transfer Mode (ATM), Frame Relay, etc. Furthermore, in embodiments where the network 616 represents a combination of multiple sub-networks, different network layer protocols are used at each of the underlying sub-networks. In some embodiments, the network 616 represents one or more interconnected internetworks, such as the public Internet or a secure channel (e.g., a VPN) from the mobile device 608 of the user 604 to the image correction system 620.

The image correction system 620 receives a first image (image 612) of a face of the user 604 from an image sensor of the mobile device 608. The image correction system 620 automatically corrects the image 612 of the face of the user 604 to comply with regulations or rules of the enrolling agency, department, or entity. The image correction system 620 includes an image correction module 624, an image constraints store 626, and a machine learning model 632. In other embodiments, the image correction system 620 includes additional or fewer components than those described herein. Similarly, the functions can be distributed among the components or different entities in a different manner than is described here.

The image constraints store 626 is a memory, storage device, or database of the image correction system 620. The image constraints store 626 is implemented using the components described in more detail with reference to FIG. 8. The image constraints store 626 stores multiple constraints specifying an image quality of captured images. The constraints can be specified by regulations of an enrolling entity, such as a DMV. For example, an image quality of acceptable images can specify, but is not limited to, an amount of lighting acceptable for the image 612, whether a flash is to be used or not, whether a subject of the image 612 can wear glasses or not, a color or pattern of a background of the image, a facial pose of the user 604, a facial expression of the user 604, a distance of the user 604 from the camera, or a combination thereof. A constraint can specify a limit on an amount of flash lighting used to capture images, for example, a brightness level or a distance of a source of the flash lighting from the user 604.

In some embodiments, a constraint specifies a limit on a focal length of a camera lens used to capture images. A focal length of a camera lens is a distance between the lens and an image sensor of the camera when the subject is in focus, usually stated in millimeters (for example, 28 mm, 50 mm, or 100 mm). In the case of zoom lenses, a minimum and maximum focal length can be stated, for example, 18-55 mm. For example, a constraint can specify that the focal length should lie between 100 mm to 200 mm. Another example constraint can specify that the user 604 should be between 15 and 20 feet from the camera when the image 612 is taken.

The image correction module 624 performs automatic image correction and generation. The image correction module 624 can be implemented in hardware or software. For example, the image correction module 624 can be implemented as hardware circuitry or software code that is incorporated into a computing system such as a server system (e.g., a cloud-based server system), a desktop or laptop computer, or a mobile device (e.g., a tablet computer or smartphone). The image correction module 624 is implemented using the components described in more detail with reference to FIG. 8. The image correction module 624 receives, from the mobile device 608, the image 612 of the face of the user 604.

The image correction module 624 is communicatively coupled to the image constraints store 626. The image constraints store 626 is a memory, storage device, or database of the image correction system 620, storing multiple constraints specifying an image quality. The image correction module 624 determines that the image 612 of the face of the user 604 violates at least one constraint of the multiple constraints specifying the image quality. For example, the image correction module 624 determines that the image 612 violates a constraint because the user 604 is wearing glasses in the image 612. Determining that the image 612 of the face of the user 604 violates a constraint includes determining that the user 604 is wearing glasses in the image 612. Generating the image 636 includes deleting a portion of the image 612, where the portion corresponds to the glasses. For example, image processing methods based on robust local binary patterns and robust alignment can be used by the image correction module 624 to determine that the user 604 is wearing glasses in the image 612. In some embodiments, the image 612 is normalized to deal with scale and rotation. The eye glasses region is detected assuming that a nosepiece of the glasses is placed at the same level as the center of the eyes. A robust local binary pattern is constructed to describe the eyes region.

In some embodiments, the image correction module 624 determines that the image 612 of the face of the user 604 violates a constraint by determining a first expression of the user 604 in the image 612. For example, the user 604 is smiling, winking, or frowning. Generating the image 636 includes adjusting the expression of the user 604 in the image 612 to match a second expression specified by the constraints. A constraint from an enrolling agency can specify that the user 604 should not be smiling, for example, in a passport image. The image correction module 624 extracts real valued and binary parameters from the facial image 612 to determine the first expression. The real valued parameters are normalized. The machine learning model 632 is trained with the parameters as inputs. After training, the machine learning model 632 is used for expression classification and correction to the image 636.

In some embodiments, the image correction module 624 determines that the image 612 violates a constraint specifying a (required) facial pose of the user 604 in image 612. For example, the image 612 can be captured from a side of the face of the user 604, the top of the face, or the bottom of the face. The constraint can specify that the image 612 must be captured from the front of the face. The image correction module 624 determines that the image 612 of the face of the user 604 violates the constraint by determining a first facial pose of the user 604 in the image 612. Generating the image 636 includes adjusting the first facial pose to match a second facial pose specified by the constraints. For example, the first facial pose of the face in the image 612 is estimated using parameterized qualitative features derived from sampled facial images. A temporary model image of the face with various poses can be synthesized using texture mapping. The model images are accumulated and the pose of the face is estimated as a linear combination of correlations between the models.

Responsive to determining that the image 612 of the face of the user 604 violates at least one constraint, the image correction module 624 generates a second image or "corrected image" (image 636) of the face of the user 604 based on the first image 612 of the face of the user and the at least one constraint, such that the second image 636 of the face of the user satisfies the at least one constraint. In some embodiments, generating the image 636 of the face of the user 604 includes determining a first focal length of a first camera lens (of the mobile device 608) used to capture the image 612 of the face of the user 604. The image correction module 624 determines a difference between the first focal length of the first camera lens and a limit on a second focal length of a second camera lens. The stored constraints specify the limit on the second focal length. The image 636 of the face of the user 604 is generated based on the difference between the first focal length and the limit on the second focal length.

In some embodiments, the image correction module 624 generates, using the focal length of the camera lens from the stored constraints, the corrected image 636 the face of the user 604. The image 636 satisfies the constraints. In some embodiments, the image correction module 624 determines a first focal length of a camera lens of the mobile device 608 actually used to capture the received image 612. For example, the first focal length actually used to capture image 612 can be 90 mm. The image correction module 624 determines a difference between a second focal length from the stored constraints and the first focal length actually used to capture image 612. The image correction module 624 performs focal length correction on the image 612 to generate the image 636. For example, a government agency or body can use a certain type of camera that has certain features that a smartphone does not. The smartphone photograph is thus altered and corrected to appear as if it were taken by the camera at the government agency.

In some embodiments, a constraint specifies an amount of flash lighting required for a particular image quality. The image correction module 624 performs illumination correction on the image 612 to generate the image 636. In some embodiments, Gaussian blur and subtraction or a high pass Fast Fourier Transform (FFT) filter are used. For example, the image correction module 624 can apply a Gaussian blur to the image 612 with a particular value for sigma. This results in a local average for the illumination. The global average value for the image 612 is determined. The image correction module 624 subtracts the local average value from the actual value for each pixel and adds the global average to generate the image 636.

In some embodiments, a constraint specifies a visual backdrop of captured images, as illustrated and described in more detail with reference to FIGS. 1-5B. The visual backdrop can be required by a government agency or private entity issuing an identification card. For example, a required visual backdrop can include a picture of a flag, a government building, a map of an area, or a combination thereof. The image correction module 624 uses the backdrop correction methods and virtual backdrop generation methods, illustrated and described in more detail with reference to FIGS. 1-5B above to generate the image 636 using the image 612.

In some embodiments, the image correction module 624 deletes an image of glasses that the user 604 is wearing from the image 612 to generate the image 636. For example, image editing and face synthesis can be performed to automatically remove eyeglasses from the input frontal face image 612. In some embodiments, the machine learning model 632 is trained to locate a region of eyes. A Monte Carlo method can be used to locate points on the eyeglasses frame. The image correction module 624 uses a sample-based approach to synthesize the face image 636 without the eyeglasses.

In some embodiments, the image correction module 624 adjusts the expression of the user 604 in the image 612 to generate the image 636. For example, the image correction module 624 can use image processing and image altering methods to alter the pixel values of the image 612 to remove a smile of the user 604. In some embodiments, a morph-based approach is used to generate expressions. In some embodiments, expression mapping (performance-driven animation) is used to perform movement of facial features from a library to the image 612. In other embodiments, geometry-driven feature mapping combined with image warping or eye synthesis can be used.

In some embodiments, the image correction module 624 adjusts the facial pose of the user 604 in the image 612 to generate the image 636. For example, the image correction module 624 can use image processing and image altering methods to make the image 636 appear as is the photograph was taken from the front and not from one side of the user 604. In some embodiments, the image correction module 624 reconstructs a frontal pose face image 636 from the non-frontal face image 612. The image correction module 624 estimates a change in pose with respect to yaw, pitch and roll angles based on landmark points. Tilting, stretching or mirroring operations are used to obtain the frontal pose image 636.

The machine learning model 632 is trained to detect non-compliance of the image 612 and generate the corrected, compliant image 636. The machine learning model 632 can be implemented in hardware or software. For example, the machine learning model 632 can be implemented as hardware circuitry or software code that is incorporated into a computing system such as a server system (e.g., a cloud-based server system), a desktop or laptop computer, or a mobile device (e.g., a tablet computer or smartphone). In some embodiments, the machine learning model 632 includes a generative adversarial network (GAN). A GAN is a class of artificial intelligence algorithms used in unsupervised machine learning and implemented by a system of two neural networks contesting with each other in a zero-sum game framework. In some embodiments, a GAN is used to generate the image 636 such that it appears authentic to human observers and has realistic characteristics.

In some embodiments, the image correction module 624 extracts a feature vector of image features from the image 612. At least one feature represents a first focal length of a camera lens used to capture the image 612. Other features can represent, but are not limited to, whether the user 604 is wearing glasses, whether the image 612 was taken from a side of the face of the user 604, an amount of flash lighting used, or a combination thereof. In some embodiments, the image correction system 620 produces the image 636 using the machine learning model 632 based on the feature vector. The machine learning model 632 can be trained to determine a difference between the first focal length and a limit on a second focal length of a second camera lens specified by the constraints. The machine learning model 632 is trained to generate the image 636 using the difference between the capture (first) focal length and the constraint (second) focal length. The image 636 satisfies the constraints. The operation of the machine learning model 632 is illustrated and described in more detail with reference to FIG. 7.

The image correction system 620 displays the image 636 of the face of the user 604 on a display device of the image correction system 620. Example display devices are described in more detail with reference to FIG. 8.

Figure 7:
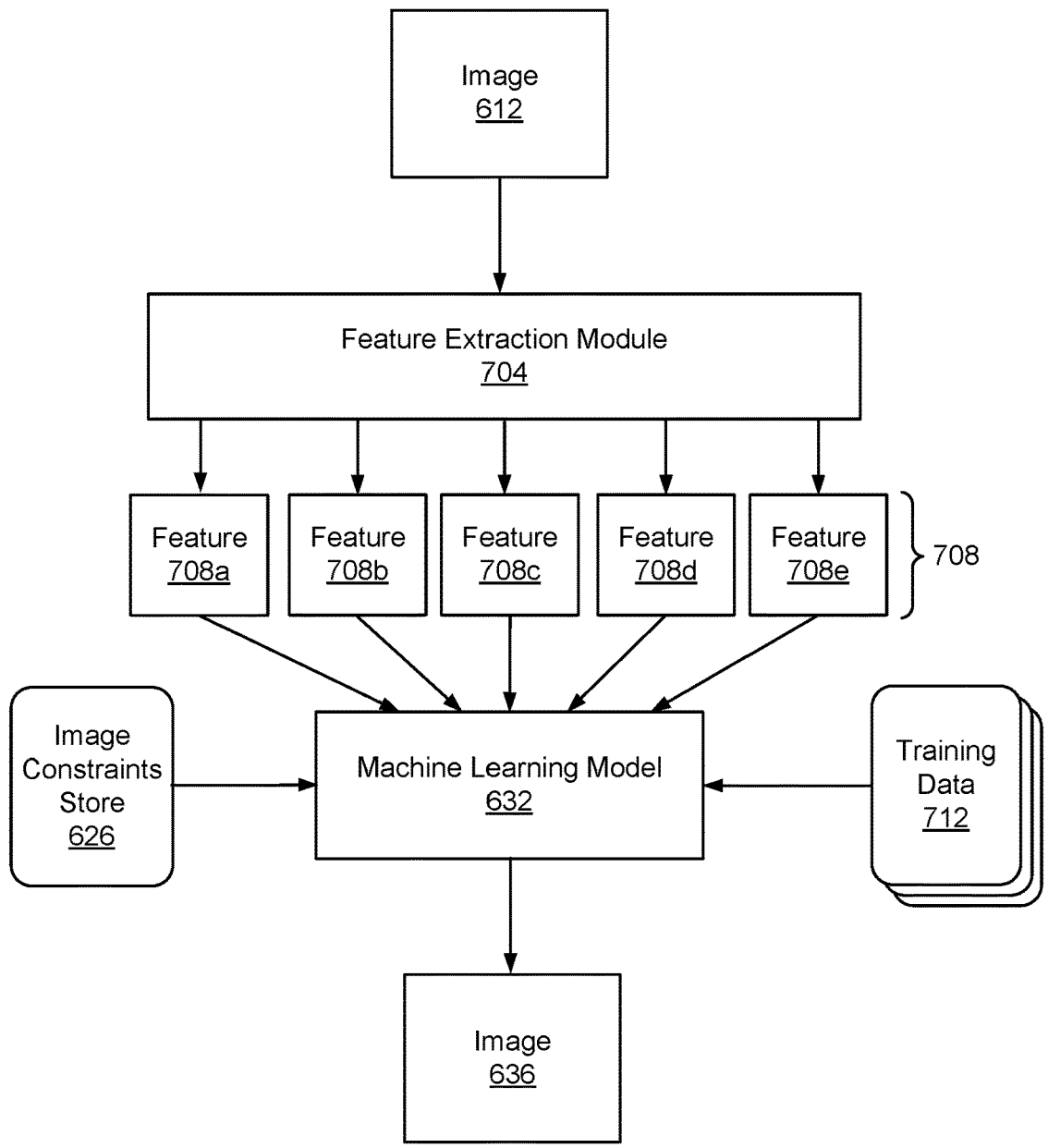
FIG. 7 is a block diagram of an architecture for automatic correction and generation of facial images, according to some implementations.

FIG. 7 is a block diagram of an architecture 700 for automatic correction and generation of facial images, according to some implementations. The architecture 700 includes a feature extraction module 704 and a machine learning model 632. In other embodiments, the architecture 700 includes additional or fewer components than those described herein. For example, if deep learning by a convolutional neural network (CNN) is used, the feature extraction is performed implicitly by the machine learning model 632, and the feature extraction module 704 is obviated. Similarly, the functions can be distributed among the components and/or different entities in a different manner than is described here.

The feature extraction module 704 extracts a feature vector 708 from the image 612. The feature vector 708 describes the appearance and image quality of the image 612 and whether the image 612 conforms to the constraints. An example feature 708a represents an amount of illumination in the image 612. A feature 708b represents whether the user 604 is wearing glasses in the image 612. A feature 708c represents a focal length of a camera lens used to take the image 612. A feature 708d represents a facial expression of the user 604 in the image 612. A feature 708e represents a facial pose. The feature extraction module 704 can use dimensionality reduction, such as linear discriminant analysis (LDA) or principle component analysis (PCA) to reduce an amount or dimensions of data in the feature vector 708 to a smaller, more representative set of data.

The machine learning model 632 is trained using the training data 712 and the constraints in the image constraints store 626. The training data 712 includes compliant as well as non-compliant images with labeled features. In some embodiments, the machine learning model 632 is configured to generate the image 636, such that the image 636 complies with the constraints. Machine learning techniques are used to train the machine learning model 632, that when applied to the feature vector 708, outputs indications of whether the feature vector 708 is compliant with the constraints. For example, when applied to features of the image 612, the machine learning model 632 determines whether the image 612 has a correct second focal length. In some embodiments, supervised machine learning is used to train the machine learning model 621 with the training data 712. In other embodiments, different machine learning techniques, such as GAN, deep learning, neural networks, linear support vector machine (linear SVM), boosting for other algorithms (e.g., AdaBoost), logistic regression, naïve Bayes, memory-based learning, random forests, bagged trees, decision trees, boosted trees, or boosted stumps, can be used.

Figure 8:
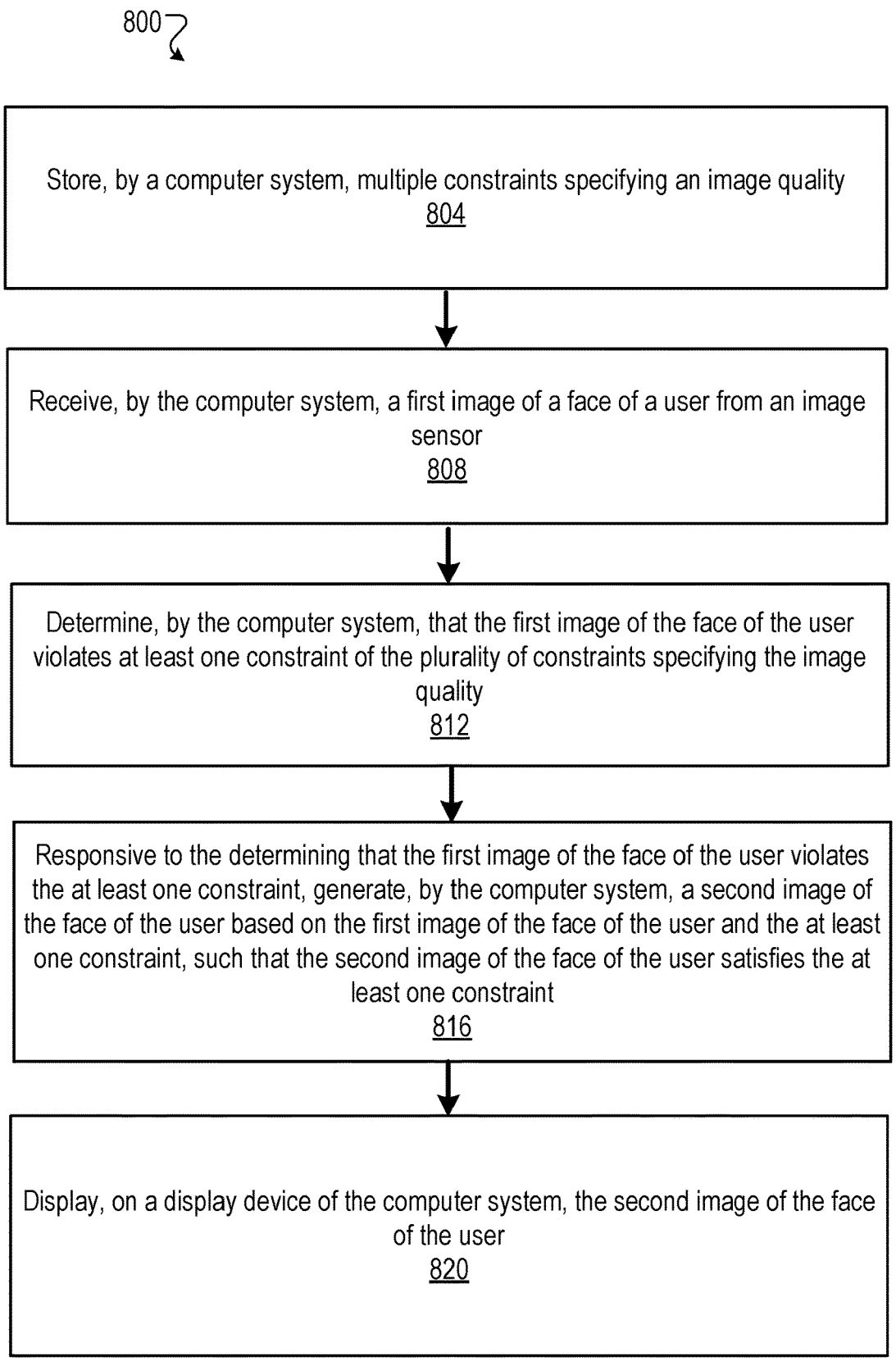
FIG. 8 illustrates a process for automatic correction and generation of facial images, according to some implementations.

FIG. 8 illustrates a process 800 for automatic correction and generation of facial images, according to some implementations. In some embodiments, the process of FIG. 800 is performed by the image correction system 620. Other entities, for example, one or more components of a computing system perform some or all of the steps of the process 800 in other embodiments. Likewise, embodiments can include different or additional steps, or perform the steps in different orders.

The image correction system 620 stores (804) multiple constraints specifying an image quality required for images. The constraints are stored in the image constraints store 626. In some embodiments, a constraint specifies a limit on a focal length of a camera lens used to capture images. A focal length of a camera lens is a distance between the lens and an image sensor of the camera when the subject is in focus, usually stated in millimeters (for example, 28 mm, 50 mm, or 100 mm). In the case of zoom lenses, a minimum and maximum focal length can be stated, for example, 18-55 mm. For example, a constraint can specify that the focal length should lie between 100 mm to 200 mm. Another example constraint can specify that the user 604 should be between 15 and 20 feet from the camera when the image 612 is taken.

The image correction system 620 receives (808) a first image 612 of a face of a user 604 from a computer device (such as the mobile device 608). The mobile device 608 captures an image of a face of the user 604. The mobile device 608 can be any hand-held or personal digital device that includes an image sensor or camera, e.g., a smartphone, a tablet, a PC, a laptop. In some examples, the mobile device 608 can be a digital camera. The mobile device 608 is implemented using the components described in more detail with reference to FIG. 8. The mobile device 608 takes a photograph (captures the image 612) of the face of the user 604 and transmits the image 612 of the face to the image correction system 620.

The image correction system 620 determines (812) that the first image 612 violates at least one constraint of the multiple constraints. For example, the image correction module 624 determines that the image 612 violates a constraint because the user 604 is wearing glasses in the image 612. Determining that the image 612 of the face of the user 604 violates a constraint includes determining that the user 604 is wearing glasses in the image 612. Generating the image 636 includes deleting a portion of the image 612, where the portion corresponds to the glasses. For example, image processing methods based on robust local binary patterns and robust alignment can be used by the image correction module 624 to determine that the user 604 is wearing glasses in the image 612. In some embodiments, the image 612 is normalized to deal with scale and rotation. The eye glasses region is detected assuming that a nosepiece of the glasses is placed at the same level as the center of the eyes. A robust local binary pattern is constructed to describe the eyes region.

Responsive to the determining that the first image 612 of the face of the user 604 violates the at least one constraint, the image correction system 620 generates (816) a second image 636 of the face of the user 604. The second image 636 is generated based on the first image 612 and the at least one constraint, such that the second image 636 satisfies the constraints. In some embodiments, generating the image 636 of the face of the user 604 includes determining a first focal length of a first camera lens (of the mobile device 608) used to capture the image 612 of the face of the user 604. The image correction module 624 determines a difference between the first focal length of the first camera lens and a limit on a second focal length of a second camera lens. The stored constraints specify the limit on the second focal length. The image 636 of the face of the user 604 is generated based on the difference between the first focal length and the limit on the second focal length.

The image correction system 620 displays (820) the second image 636 on a display device. Example display devices are described in more detail with reference to FIG. 8.

Various implementations of devices, systems, and techniques described herein can be realized in digital electronic circuits, integrated circuits, specially designed ASICs (application specific integrated circuits), computer hardware, firmware, software, or combinations thereof. These various implementations can include implementation in one or more computer programs that are executable or interpretable on a programmable system including at least one programmable processor, which can be special or general purpose, coupled to receive data and instructions from, and to transmit data and instructions to, a storage system, at least one input device, and at least one output device.

Implementations can involve computer programs (also known as programs, software, software applications or code), including machine instructions for a programmable processor, and can be implemented in a high-level procedural or object-oriented programming language, or in assembly or machine language. As used herein, the terms "machine-readable medium" and "computer-readable medium" refer to any computer program product, apparatus, or device (for example, magnetic discs, optical disks, memory, or programmable logic devices (PLDs)) used to provide machine instructions or data to a programmable processor including a machine-readable medium that receives machine instructions as a machine-readable signal. The term "machine-readable signal" refers to any signal used to provide machine instructions or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The processor and the memory can be supplemented by, or incorporated in, an ASIC.

To provide for interaction with a user, the systems and techniques described here can be implemented on a computer having a display device (e.g., a cathode ray tube, a liquid crystal display monitor, a light-emitting diode monitor, or an organic light-emitting diode monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method comprising:
   storing, by a computer system, at least one constraint specifying an image quality;

receiving, by the computer system, a first image of a face of a user from a computer device;

determining, by the computer system, that the first image of the face of the user violates at least one constraint specifying a limit on a focal length of a camera lens used to capture images;

determining, by the computer system, a first focal length of a first camera lens used to capture the first image of the face of the user;

determining, by the computer system, a difference between the first focal length of the first camera lens and a limit on a second focal length of a second camera lens, the at least one constraint specifying the limit on the second focal length, wherein a second image of the face of the user is generated based on the difference between the first focal length and the limit on the second focal length; and displaying, on a display device of the computer system, the second image of the face of the user.

2. The method according to claim 1, wherein generating the second image comprises;

extracting, by the computer system, a feature vector from the first image, the feature vector representing the first focal length of the first camera lens used to capture the first image; and producing, by the computer system, the second image using a machine learning model based on the feature vector, the machine learning model trained to determine a difference between the first focal length and the limit on the second focal length of the second camera lens specified by the at least one constraint.

3. The method according to claim 1, comprising determining, by the computer system, that the first image of the face of the user violates at least one constraint specifying a virtual backdrop of the images;

replacing the background of the first image by the virtual backdrop.

4. The method according to claim 1, comprising determining, by the computer system, that the user is wearing glasses in the first image, the generating of the second image comprising deleting, by the computer system, a portion of the first image, the portion corresponding to the glasses.

5. The method according to claim 1, comprising determining, by the computer system, a first expression of the user in the first image, the generating of the second image comprising adjusting, by the computer system, the expression of the user in the first image to match a second expression specified by the at least one constraint.

6. The method according to claim 1, comprising determining, by the computer system, a first facial pose of the user in the first image, the generating of the second image comprising adjusting, by the computer system, the first facial pose to match a second facial pose specified by the at least one constraint.

7. The method according to claim 1, wherein the generating of the second image is performed by a generative adversarial network of the computer system.

8. A computer system, comprising:

one or more computer processors; and one or more non-transitory storage media storing instructions which, when executed by the one or more computer processors, cause the one or more computer processors to:

store at least one constraint specifying an image quality;

receive a first image of a face of a user from a computer device;

determine that the first image of the face of the user violates at least one constraint specifying a limit on a focal length of a camera lens used to capture images;

determine a first focal length of a first camera lens used to capture the first image of the face of the user;

determine a difference between the first focal length of the first camera lens and a limit on a second focal length of a second camera lens, the at least one constraint specifying the limit on the second focal length, wherein a second image of the face of the user is generated based on the difference between the first focal length and the limit on the second focal length; and display, on a display device of the computer system, the second image of the face of the user.

9. The computer system according to claim 8, wherein the instructions causes the one or more computer processors to generate the second image by:

extracting a feature vector from the first image, the feature vector representing a first focal length of a first camera lens used to capture the first image; and producing the second image using a machine learning model based on the feature vector, the machine learning model trained to determine a difference between the first focal length and a limit on a second focal length of a second camera lens specified by the plurality of constraints.

10. The computer system according to claim 8, wherein the instructions cause said one or more processors to:

determine that the first image of the face of the user violates at least one constraint specifying a virtual backdrop of the images; and replace the background of the first image by the virtual backdrop.

11. The computer system according to claim 8, wherein the instructions cause said one or more processors to determine that the user is wearing glasses in the first image, and to generate the second image by deleting a portion of the first image, the portion corresponding to the glasses.

12. The computer system according to claim 8, wherein the instructions cause said one or more processors to determine a first expression of the user in the first image, and to generate the second image by adjusting the expression of the user in the first image to match a second expression specified by the at least one constraint.

13. The computer system according to claim 8, wherein the instructions cause said one or more processors to determine a first facial pose of the user in the first image, and to generate the second image by adjusting the first facial pose to match a second facial pose specified by the at least one constraint.

14. The computer system according to claim 8, wherein the second image is generated by a generative adversarial network of the computer system.

15. One or more non-transitory storage media storing instructions which, when executed by one or more computing devices, cause the one or more computing devices to:

store at least one constraint specifying an image quality;

receive a first image of a face of a user from a computer device;

determine that the first image of the face of the user violates at least one constraint specifying a limit on a focal length of a camera lens used to capture images;

determine a first focal length of a first camera lens used to capture the first image of the face of the user;

determine a difference between the first focal length of the first camera lens and a limit on a second focal length of a second camera lens, the at least one constraint specifying the limit on the second focal length, wherein a second image of the face of the user is generated based on the difference between the first focal length and the limit on the second focal length; and display, on a display device of the computer system, the second image of the face of the user.

16. The one or more non-transitory storage media according to claim 15, wherein the instructions cause the one or more computing devices to generate the second image by:

extracting a feature vector from the first image, the feature vector representing a first focal length of a first camera lens used to capture the first image; and producing the second image using a machine learning model based on the feature vector, the machine learning model trained to determine a difference between the first focal length and a limit on a second focal length of a second camera lens specified by the plurality of constraints.

17. The one or more non-transitory storage media according to claim 15, wherein the instructions cause the one or more computing devices to:

determine that the first image of the face of the user violates at least one constraint specifying a virtual backdrop of the images; and replace the background of the first image by the virtual backdrop.

18. The one or more non-transitory storage media according to claim 15, wherein the instructions cause the one or more computing devices to determine that the user is wearing glasses in the first image, and to generate the second image by deleting, a portion of the first image, the portion corresponding to the glasses.

19. The one or more non-transitory storage media according to claim 15, wherein the instructions cause the one or more computing devices to determine a first expression of the user in the first image, and to generate the second image by adjusting the expression of the user in the first image to match a second expression specified by the at least one constraint.

20. The one or more non-transitory storage media according to claim 15, wherein the instructions cause the one or more computing devices to determine a first facial pose of the user in the first image, and to generate the second image by adjusting the first facial pose to match a second facial pose specified by the at least one constraint.

* * * * *